United States Patent
Sheidler et al.

(10) Patent No.: US 7,992,370 B2
(45) Date of Patent: *Aug. 9, 2011

(54) WORK MACHINE WITH AUXILIARY POWER UNIT AND INTELLIGENT POWER MANAGEMENT

(75) Inventors: Alan Sheidler, Moline, IL (US); Benjamin E. Ramp, Geneseo, IL (US)

(73) Assignee: Deere & Company, Moline, IL (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/048,589

(22) Filed: Mar. 14, 2008

(65) Prior Publication Data

US 2009/0233759 A1 Sep. 17, 2009

(51) Int. Cl.
*A01D 34/00* (2006.01)
(52) U.S. Cl. ............................................. 56/10.7; 460/6
(58) Field of Classification Search ........ 460/6; 60/698; 56/10.2 R, 10.6, 10.7
See application file for complete search history.

(56) References Cited

U.S. PATENT DOCUMENTS

| | | | | |
|---|---|---|---|---|
| 2,689,621 | A | * | 9/1954 | Bartrum .................... 180/53.1 |
| 3,093,946 | A | * | 6/1963 | Pitt et al. .................... 460/6 |
| 3,260,041 | A | * | 7/1966 | McRoberts et al. ........... 56/119 |
| 3,514,929 | A | * | 6/1970 | Cornish et al. ................ 460/6 |
| 3,583,405 | A | * | 6/1971 | Gerhardt et al. ............... 460/1 |
| 4,131,170 | A | * | 12/1978 | van der Lely ................ 180/22 |
| 4,448,157 | A | * | 5/1984 | Eckstein et al. ........ 123/142.5 R |
| 5,488,817 | A | * | 2/1996 | Paquet et al. .............. 56/10.2 R |
| 5,794,422 | A | * | 8/1998 | Reimers et al. ................ 56/11.9 |
| 6,251,009 | B1 | * | 6/2001 | Grywacheski et al. ........ 460/112 |
| 6,474,068 | B1 | * | 11/2002 | Abdel Jalil et al. ............. 60/716 |
| 6,665,601 | B1 | * | 12/2003 | Nielsen ........................ 701/50 |
| 6,745,117 | B1 | * | 6/2004 | Thacher et al. ................ 701/50 |
| 7,013,646 | B1 | | 3/2006 | Serkh et al. |
| 2002/0056262 | A1 | * | 5/2002 | Favache ..................... 56/16.4 A |
| 2002/0056993 | A1 | | 5/2002 | Kennedy |
| 2005/0079949 | A1 | * | 4/2005 | Suzuki ............................ 477/2 |

FOREIGN PATENT DOCUMENTS

| | | | |
|---|---|---|---|
| EP | 1219751 | A | 7/2002 |
| EP | 1571352 | A | 9/2005 |
| GB | 709777 | * | 2/1954 |
| JP | 57076263 | A * | 5/1982 |
| JP | 2004 242558 | A | 9/2004 |
| WO | 2006055978 | A | 5/2006 |
| WO | 2007043924 | A | 4/2007 |

OTHER PUBLICATIONS

European Search Report dated Jul. 15, 2009 (8 pages).
European Search Report dated Sep. 18, 2009, 12 pages.

* cited by examiner

*Primary Examiner* — Thomas B Will
*Assistant Examiner* — Joan D Misa
(74) *Attorney, Agent, or Firm* — Taylor IP, PC

(57) ABSTRACT

A work machine includes a primary power unit having a rated primary output. The primary power unit is couplable with at least one primary load, including a propulsion load. An auxiliary power unit is mechanically independent from the primary power unit, and has a rated auxiliary output which is smaller than the primary output. The auxiliary power unit is couplable with at least one external load, including an operator initiated load. At least one electrical processing circuit is configured for selectively coupling the primary power unit with one or more primary loads, and for selectively coupling the auxiliary power unit with one or more external loads.

22 Claims, 3 Drawing Sheets

WORK MACHINE WITH AUXILIARY POWER UNIT AND INTELLIGENT POWER MANAGEMENT

FIELD OF THE INVENTION

The present invention relates to work machines, and, more particularly, to work machines including an internal combustion engine which may be used to drive primary and external loads.

BACKGROUND OF THE INVENTION

A work machine, such as a construction work machine, an agricultural work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine cooling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The air flow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an infinitely variable transmission (IVT) which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

A work machine including an IC engine coupled with an IVT may exhibit problems to be overcome in two ways: First, sudden loads placed on the drivetrain or vehicle hydraulic functions cause the engine speed to decrease. The response time to change the IVT ratio to reduce engine load once decreased is slower than necessary to prevent substantial engine speed drop and sometimes stall. Second, when an external load is applied to the IC engine, such as when filling the bucket of a front end loader on an IVT vehicle, the operator may command a vehicle speed substantially more than what is capable from the IC engine. Under these conditions the IVT output torque and speed may result in excessive wheel slippage and other undesirable characteristics. Likewise, if an external load from another external function to the transmission is activated, such as hydraulic functions, the external load combined with the transmission output capability may place the engine in an overload condition.

The demands for increased performance and fuel economy will increase significantly for work machines within the next decade. This will be complicated by the implementation of devices to reduce emissions. The increasing size and productivity of work machines is expected to result in power demand higher than will be available from economical single internal combustion engines. This will drive the development of vehicles using very large, heavy and expensive industrial engines. The complexity and cost of such engines may be prohibitive and curtail the implementation of higher capacity machinery.

One method around the problem is to use hybrid electric-IC engine technology with a storage battery to supplement the internal combustion engine with electric power boost. This is expected to work very well, but the electric power boost is only available for relatively short periods of time. The amount of time available for electric boost is determined by the size of the battery. Batteries with enough capacity to provide sustained levels of power boost will of necessity be large, heavy and costly, thus limiting their practicality.

Another advantage with battery boosted hybrids is the ability to operate electrical drives with the IC engine shut down. For example, the HVAC, lights, air compressors, cooling fans, grain tank unloading systems, etc., could be operated without the need to start the IC engine. The length of time these drives can be operated with the engine off is limited, again, by the size of the battery. Batteries large enough to do significant work for extended time periods with the engine off may be too large, heavy and costly to be practical.

What is needed in the art is a work machine and corresponding method of operation providing sustained, increased power capability with many of the advantages of electric-IC engine hybrids, while still meeting increasingly stringent emissions requirements.

SUMMARY OF THE INVENTION

The invention in one form is directed to a work machine, including a primary power unit having a rated primary output. The primary power unit is couplable with at least one primary load, including a propulsion load. An auxiliary power unit is mechanically independent from the primary power unit, and has a rated auxiliary output which is smaller than the rated primary output. The auxiliary power unit is couplable with at least one external load, including an operator initiated load. At least one electrical processing circuit is configured for selectively coupling the primary power unit with one or more primary loads, and for selectively coupling the auxiliary power unit with one or more external loads.

The invention in another form is directed to a method of operating a work machine, including the steps of: driving a propulsion load with a primary power unit, the primary power unit having a rated primary output; and driving an operator initiated load with an auxiliary power unit. The auxiliary power unit is mechanically independent from the primary power unit, and has a rated auxiliary output which is smaller than the rated primary output.

DETAILED DESCRIPTION OF THE INVENTION

Figure 1:
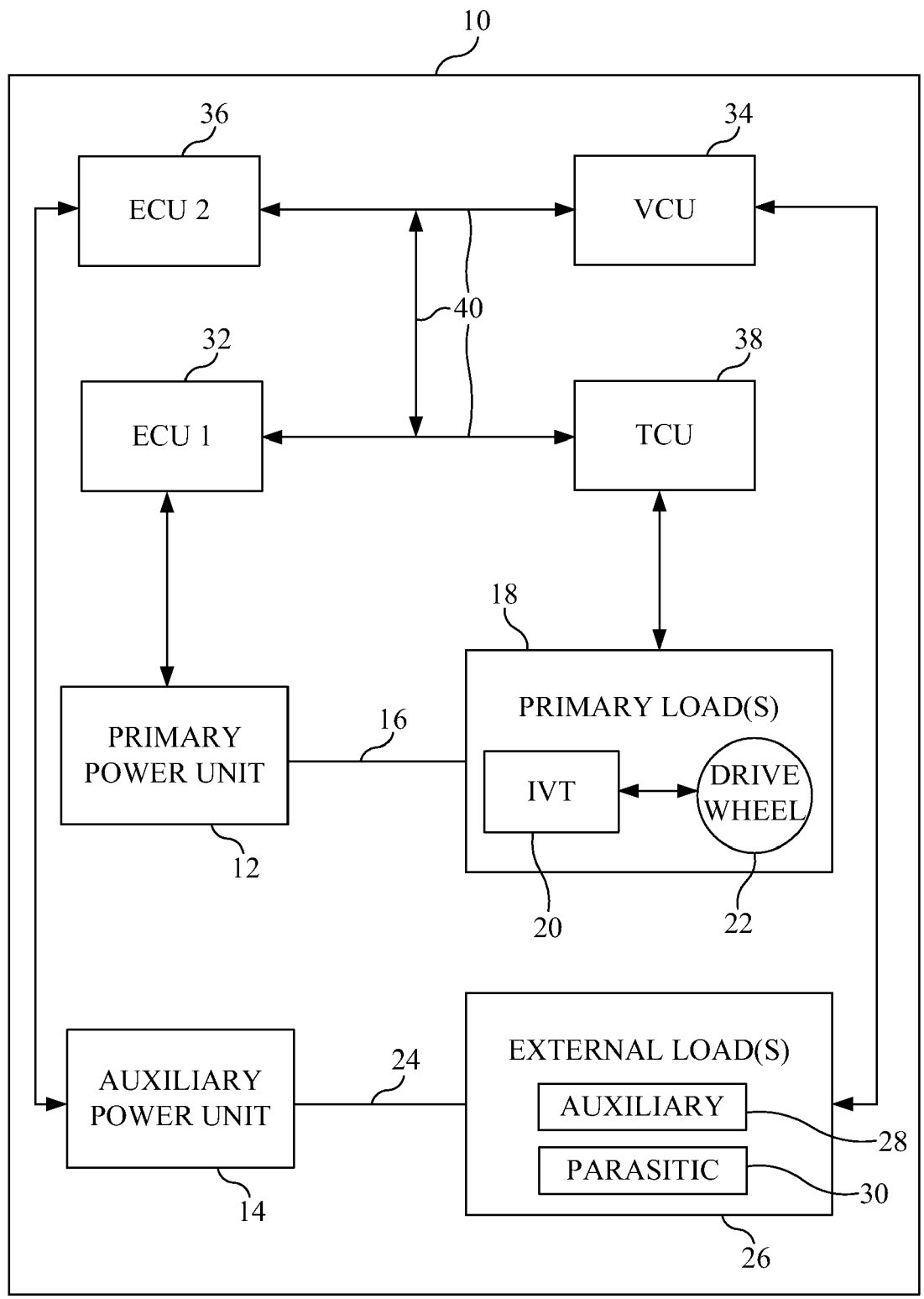
FIG. 1 is a schematic illustration of an embodiment of a work machine of the present invention.

Referring now to FIG. 1, there is shown a schematic illustration of an embodiment of a work machine 10 of the present invention. Work machine 10 is assumed to be an agricultural work machine in the form of a John Deere agricultural combine, but could be a different type of work machine such as a construction, forestry, mining, or industrial work machine.

Work machine 10 includes a primary power unit in the form on a primary IC engine 12, and an auxiliary power unit in the form of an auxiliary IC engine 14. Primary IC engine 12 has a primary drivetrain, typically including an output crankshaft 16, with a rated primary output which drives one or more primary loads 18. The primary load(s) include a propulsion load for selectively propelling work machine 10 across the ground. To that end, an IVT 20 in the form of a hydrostatic transmission may be selectively engaged/disengaged with crankshaft 16, and provides motive force to one or more drive wheels 22. Of course, it will be appreciated that in the case of a track-type work vehicle, crankshaft 16 may be coupled with a ground engaging track.

Auxiliary IC engine 14 is mechanically independent from primary IC engine 12. Auxiliary IC engine 14 has an auxiliary drivetrain, typically including an output crankshaft 24, with a rated auxiliary output which is less than the rated primary output of IC engine 12. In the embodiment shown, primary IC engine 12 is assumed to be a 13.5 L engine with a rated output of 425 kW, and auxiliary IC engine 14 is assumed to be a 2.4 L engine with a rated output of 56 kW.

Auxiliary IC engine 14 drives one or more external loads 26, which includes one or more auxiliary loads 28, and may include one or more parasitic loads 30. Auxiliary loads 28 are non-drivetrain hydraulic or electric loads placed upon IC engine 14 through selective operator intervention (e.g., an auxiliary hydraulic load such as an unloading auger on a combine, a front end loader, a backhoe attachment, etc.) Parasitic loads 30 are non-drivetrain loads placed upon IC engine 14 through normal operation of the work machine, without operator intervention (e.g., an electrically driven engine cooling fan associated with primary IC engine 12, etc.).

Primary IC engine 12 and auxiliary IC engine 14 are each assumed to be a diesel engine in the illustrated embodiment, but could also be a gasoline engine, propane engine, etc. IC engines 12 and 14 are sized and configured according to the application, but IC engine 14 is assumed to have a rated output that is smaller than the rated output from IC engine 12.

A first engine control unit (ECU) 32 electronically controls operation of primary IC engine 12, and is coupled with a plurality of sensors (not specifically shown) associated with operation of primary IC engine 12. For example, ECU 32 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 32 may receive output signals from vehicle control unit (VCU) 34 representing vehicle control parameters input by an operator, such as a commanded ground speed (indicated by a position of the gear shift lever and throttle and/or hydrostat lever) or a commanded direction of work machine 10 (indicated by an angular orientation of the steering wheel).

Similarly, a second ECU 36 electronically controls operation of auxiliary IC engine 14. ECU 36 operates in a manner similar to ECU 32 described above, and will not be described in further detail. It will also be appreciated that for certain applications, ECU 32 and ECU 36 can be combined into a single controller.

Transmission control unit (TCU) 38 electronically controls operation of IVT 20, and is typically coupled with a plurality of sensors (not shown) associated with operation of IVT 20. ECU 32, VCU 34, ECU 36 and TCU 38 are coupled together via a bus structure providing two-way data flow, such as controller area network (CAN) bus 40.

Although the various electronic components such as ECU 32, VCU 34, ECU 36 and TCU 38 are shown coupled together using wired connections, it should also be understood that wireless connections may be used for certain applications.

Figure 2A:
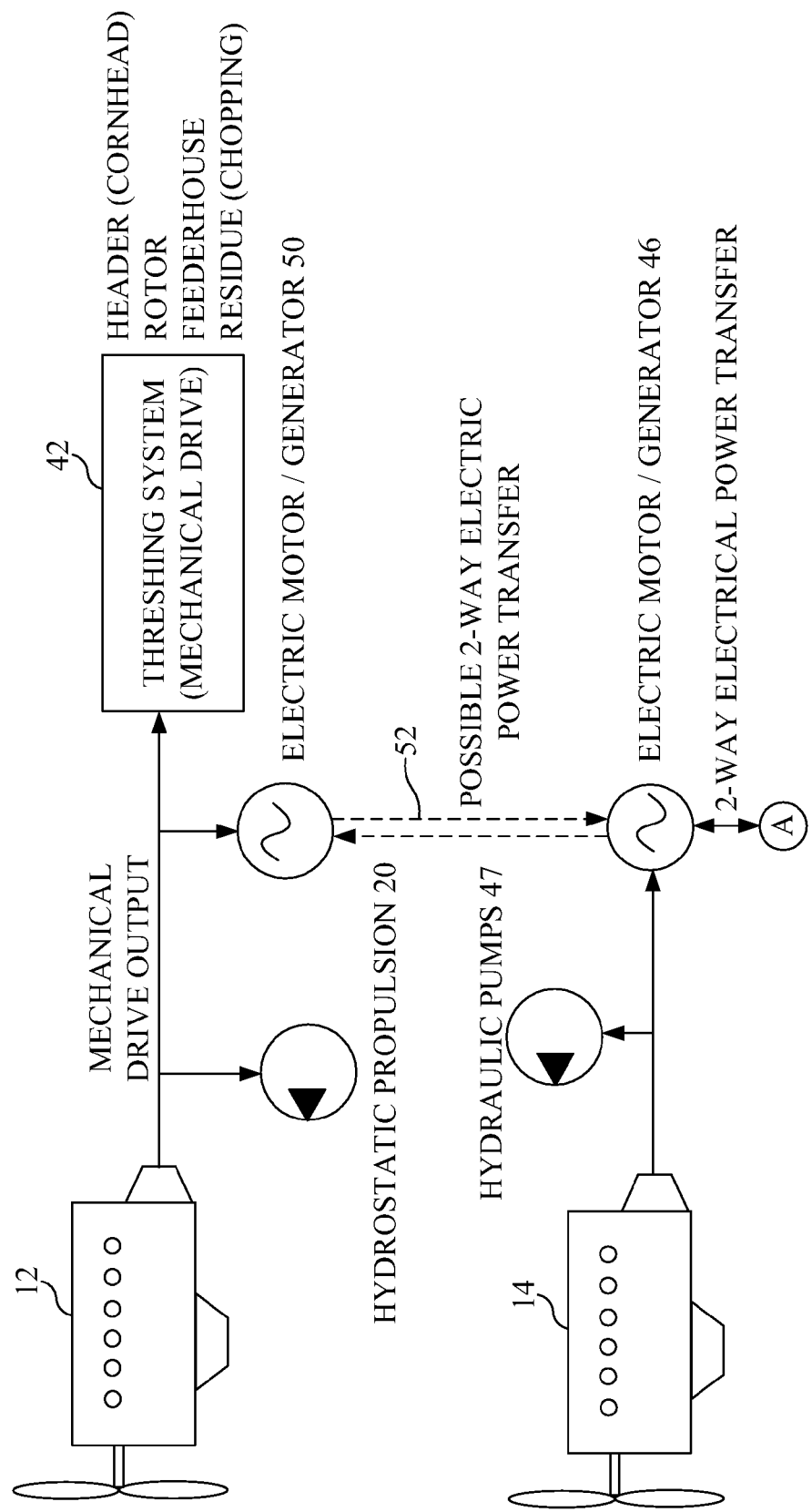
FIGS. 2A and 2B are a schematic illustration of a particular embodiment of a work machine of the present invention in the form of an agricultural combine.
Figure 2B:
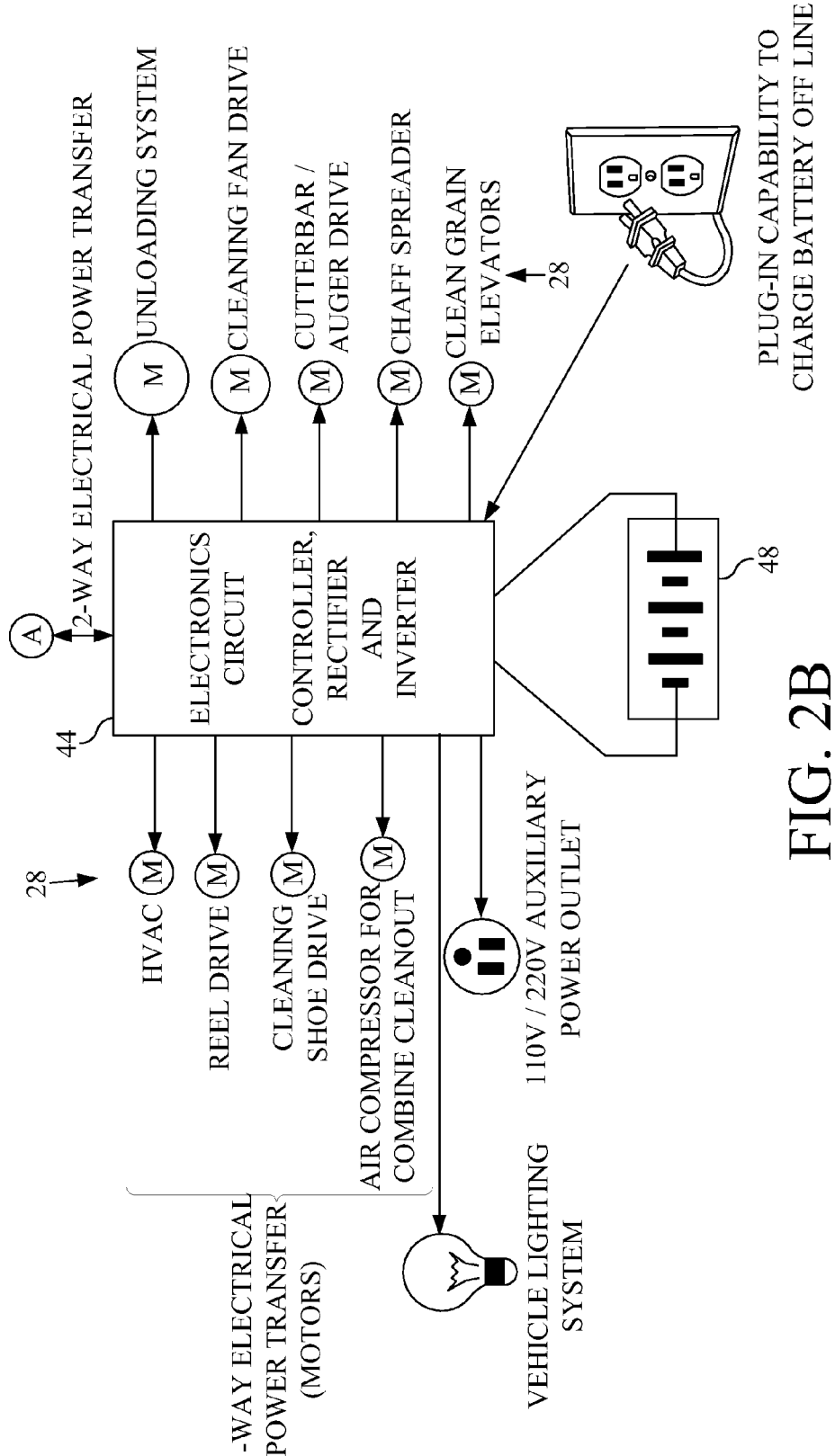

Referring now to FIGS. 2A and 2B, a specific embodiment of work machine 10 of the present invention in the form of an agricultural combine will be described in greater detail.

The primary loads driven by primary IC engine 12 include two types of drivetrain driven loads; namely, loads associated with the hydrostatic propulsion 20 and loads associated with the threshing system 42. The threshing system loads are drivetrain loads associated with one or more of the following: a cutting platform; a header; a feederhousing; a rotor; a separator; and a residue chopper.

The external loads driven by auxiliary IC engine 14 include two types of non-drivetrain, hydraulic or electrical loads; namely, auxiliary loads commanded by an operator and parasitic loads not commanded by an operator. In the embodiment of FIG. 2, the auxiliary loads 28 are non-drivetrain loads associated with one or more of the following: a heating and air conditioning system; a reel drive; a cleaning shoe drive; an air compressor for cleanout function; a vehicle lighting system; a clean grain unloading system; a cleaning fan drive; a cutterbar/auger drive; a chaff spreader; a clean grain elevator; and an auxiliary electrical power outlet. All of these auxiliary loads 28 (except the lighting system and auxiliary electrical power outlet) are indicated as being electrically driven loads, powered by respective electric motors (each designated "M", but not specifically numbered). The various motors M are selectively energized using electronics circuit 44 (shown schematically in block form), which may include VCU 34, a rectifier and a DC-to-AC inverter. Electronics circuit 44 electrically couples an auxiliary motor/generator 46 with a motor M associated with a selected auxiliary load 28. When providing electrical power to one or more auxiliary loads 28, it will be appreciated that auxiliary motor/generator 46 is operated as a motor/generator with an electric power output. The auxiliary loads can also include one or more operator initiated hydraulic loads, represented by hydraulic pumps 47.

In the event that auxiliary IC engine 14 is not operating and electrical power is required for temporary powering of one or more auxiliary loads 28, an electrical storage battery 48 is also coupled with electronics circuit 44. Of course, a bank of batteries can be electrically connected together for a higher amp*hour rating. The power from battery 48 can be applied as DC power, or inverted and applied as AC power.

The external loads 26 can be hardwired to the electronics circuit 44, auxiliary motor/generator 46 and/or battery 48, or alternatively may be coupled using modular connectors or plugs (e.g., one or more of the electrical plug-in outlets shown in FIG. 2A). Further, the external loads 26 may be driven at the same or a different operating speed than the primary IC engine 12. This allows the external load functions to be at a different speed than the threshing and propulsion functions, which can be important for certain operating conditions such as tougher crop material when approaching dusk, etc.

According to another aspect of the present invention, primary IC engine 12 may be coupled with a primary motor/generator 50. Primary motor/generator 50 and auxiliary motor/generator 46 are electrically coupled together, as indicated by electric power lines 52. This allows intelligent power management (IPM) by splitting the power needs between primary IC engine 12 and auxiliary IC engine 14. Electric power can be transferred from primary motor/generator 50 to auxiliary motor/generator 46, or vice versa, depending upon the power needs associated with primary loads 18 or external loads 28.

In the embodiment shown and described above, the primary IC engine 12 directly drives only the propulsion loads and the threshing system loads. The auxiliary IC engine 14 drives the external loads 26, including the auxiliary loads 28 and parasitic loads 30. However, depending upon how the IC engines 12 and 14 are sized and configured, it may be desirable to drive at least some of the auxiliary loads 28 and/or parasitic loads 30 using primary IC engine 12. In any event, enough of the external loads 26 are driven by auxiliary IC engine 14 such that primary IC engine 12 is not placed in an overload condition during operation.

Having described the preferred embodiment, it will become apparent that various modifications can be made without departing from the scope of the invention as defined in the accompanying claims.

The invention claimed is:

1. A work machine, comprising:
   a primary power unit having a rated primary output, said primary power unit being couplable with at least one primary load, said at least one primary load including a propulsion load;
   an auxiliary power unit which is mechanically independent from said primary power unit, said auxiliary power unit having a rated auxiliary output which is smaller than said rated primary output, said auxiliary power unit being couplable with at least one external load, said at least one external load including an operator initiated load; and
   at least one electrical processing circuit configured for selectively coupling said primary power unit with at least one of said at least one primary load, and for selectively coupling said auxiliary power unit with at least one said at least one external load said auxiliary power unit including an auxiliary motor-generator mechanically coupled with said auxiliary power unit, said auxiliary motor-generator being configured to electrically drive at least one said at least one external load, said primary power unit including a primary motor-generator mechanically coupled with said primary power unit, said primary motor-generator and said auxiliary motor-generator being electrically coupled together.

2. The work machine of claim 1, wherein said primary power unit includes a primary drive train, and each of said at least one primary load is driven by said primary drive train.

3. The work machine of claim 1, wherein said work machine is an agricultural harvester, and said at least one primary load includes a threshing system load.

4. The work machine of claim 3, wherein said agricultural harvester is an agricultural combine, and said threshing system load corresponds to at least one of:
   a cutting platform;
   a header;
   a feederhousing;
   a rotor;
   a separator; and
   a residue chopper.

5. The work machine of claim 1, wherein each of said at least one external load corresponds to one of a parasitic load and an auxiliary load.

6. The work machine of claim 5, wherein each said parasitic load is a non-drivetrain load without operator intervention, and each said auxiliary load is a non-drivetrain load with operator intervention.

7. The work machine of claim 5, wherein said work machine is an agricultural combine, and said at least one auxiliary load corresponds to at least one of:
   a heating and air conditioning system;
   a reel drive;
   a cleaning shoe drive;
   an air compressor for cleanout function;
   a vehicle lighting system;
   a clean grain unloading system;
   a cleaning fan drive;
   a cutterbar or auger drive;
   a chaff spreader;
   a clean grain elevator; and
   an auxiliary electrical power outlet.

8. The work machine of claim 5, wherein at least one of said at least one said auxiliary load corresponds to a hydraulic load placed on said auxiliary power unit.

9. The work machine of claim 5, wherein said primary power unit is a primary internal combustion (IC) engine, and said auxiliary power unit is an auxiliary IC engine.

10. The work machine of claim 9, including a transmission coupled with said primary IC engine, and wherein said at least one electrical processing circuit includes a vehicle control unit (VCU) and a transmission control unit (TCU), said TCU controlling operation of said transmission, and said VCU controlling operation of at least one said at least one auxiliary load.

11. The work machine of claim 10, wherein said transmission is an infinitely variable transmission (IVT) coupled with said primary IC engine.

12. The work machine of claim 1, including at least one battery which is electrically connectable with at least one said at least one external load.

13. The work machine of claim 1, wherein said primary motor-generator and said auxiliary motor-generator are electrically coupled together for 2-way electrical power transfer.

14. The work machine of claim 1, wherein said work machine comprises one of a construction work machine, an agricultural work machine, a forestry work machine, a mining work machine, and an industrial work machine.

15. A method of operating a work machine, comprising the steps of:
   driving a propulsion load with a primary power unit, said primary power unit having a rated primary output; and
   driving an operator initiated load with an auxiliary power unit, said auxiliary power unit being mechanically independent from said primary power unit, said auxiliary power unit having a rated auxiliary output which is smaller than said primary output said auxiliary power unit including an auxiliary motor-generator mechanically coupled with said auxiliary power unit, said auxiliary motor-generator being configured to electrically drive at least one said external load, said primary power unit including a primary motor-generator mechanically coupled with said primary power unit, said primary motor-generator and said auxiliary motor-generator being electrically coupled together.

16. The method of operating a work machine of claim 15, wherein said work machine is an agricultural harvester, and including the step of driving a threshing system load with said primary power unit.

17. The method of operating a work machine of claim 16, wherein said threshing system load corresponds to at least one of:
   a cutting platform;
   a header;
   a feederhousing;
   a rotor;
   a separator; and
   a residue chopper.

18. The method of operating a work machine of claim 15, wherein said work machine is an agricultural combine, and said operator initiated load corresponds to at least one of:
   a heating and air conditioning system;
   a reel drive;
   a cleaning shoe drive;
   an air compressor for cleanout function;
   a vehicle lighting system;
   a clean grain unloading system;
   a cleaning fan drive;
   a cutter bar or auger drive;
   a chaff spreader;
   a clean grain elevator; and
   an auxiliary electrical power outlet.

19. The method of operating a work machine of claim 15, wherein at least one said operator initiated load is an electrically driven load, and said step of driving said operator initiated load is carried out using said auxiliary motor-generator mechanically coupled with said auxiliary power unit.

20. The method of operating a work machine of claim 19, including at least one battery which is electrically connectable with at least one said electrically driven load.

21. The method of operating a work machine of claim 15, wherein said primary motor-generator and said auxiliary motor-generator are electrically coupled together for 2-way electrical power transfer.

22. The method of operating a work machine of claim 15, wherein said work machine comprises one of a construction work machine, an agricultural work machine, a forestry work machine, a mining work machine, and an industrial work machine.

* * * * *